(12) United States Patent
Lull et al.

(10) Patent No.: US 6,539,792 B2
(45) Date of Patent: Apr. 1, 2003

(54) METHOD AND APPARATUS FOR BALANCING RESISTANCE

(75) Inventors: John Michael Lull, Claremont, CA (US); Nelson Urdaneta, Costa Mesa, CA (US)

(73) Assignee: Unit Instruments, Yorba Linda, CA (US)

( * ) Notice: Subject to any disclaimer, the term of this patent is extended or adjusted under 35 U.S.C. 154(b) by 0 days.

(21) Appl. No.: 09/783,439

(22) Filed: Feb. 14, 2001

(65) Prior Publication Data

US 2001/0052261 A1 Dec. 20, 2001

Related U.S. Application Data

(60) Provisional application No. 60/182,306, filed on Feb. 14, 2000.

(51) Int. Cl.[7] .................................................. G01F 1/20
(52) U.S. Cl. .................................................. 73/204.15
(58) Field of Search ........................ 73/204.15, 204.16, 73/204.18, 204.19; 324/71.1, 71.2, 704, 705, 706, 714, 721; 338/20

(56) References Cited

U.S. PATENT DOCUMENTS

| | | | |
|---|---|---|---|
| 4,672,997 A | 6/1987 | Landis et al. | |
| 4,815,280 A | 3/1989 | Tujimura et al. | |
| 4,843,881 A | 7/1989 | Hubbard | 73/204.6 |
| 4,984,460 A | 1/1991 | Isoda | |
| 5,062,446 A | 11/1991 | Anderson | |
| 5,129,418 A | 7/1992 | Shimomura et al. | |
| 5,141,021 A | 8/1992 | Shimomura et al. | |
| 5,279,154 A | 1/1994 | Vavra et al. | |
| 5,394,755 A | 3/1995 | Sudo et al. | |
| 5,410,912 A | 5/1995 | Suzuki | |
| 5,441,076 A | 8/1995 | Moriya et al. | |
| 5,660,207 A | 8/1997 | Mudd | |
| 5,684,245 A | 11/1997 | Hinkle | |
| 5,711,342 A | 1/1998 | Kazama et al. | |
| 5,741,968 A | 4/1998 | Arai | |
| 5,765,283 A | 6/1998 | Mudd | |
| 5,850,850 A | 12/1998 | Mudd | |
| 5,865,205 A | 2/1999 | Wilmer | |
| 5,911,238 A | 6/1999 | Bump et al. | |
| 5,944,048 A | 8/1999 | Bump et al. | |
| 6,044,701 A | 4/2000 | Doyle et al. | |
| 6,216,726 B1 | 4/2001 | Brown et al. | |
| 6,343,617 B1 | 2/2002 | Tinsley et al. | |

FOREIGN PATENT DOCUMENTS

| | | |
|---|---|---|
| EP | 0 110 325 A1 | 6/1984 |
| EP | 0 834 723 A1 | 4/1998 |
| WO | 01/04580 A2 | 1/2001 |
| WO | 01/04582 A1 | 1/2001 |
| WO | 01/04715 A1 | 1/2001 |
| WO | 01/04716 A1 | 1/2001 |
| WO | 01/04717 A1 | 1/2001 |
| WO | 01/04923 A1 | 1/2001 |

OTHER PUBLICATIONS

International Search Report mailed Jun. 5, 2001 in corresponding PCT Application PCT/US01/04609, filed Feb. 14, 2001.

*Primary Examiner*—Hezron Williams
*Assistant Examiner*—Corey D. Mack
(74) *Attorney, Agent, or Firm*—Wolf, Greenfield & Sacks, P.C.

(57) ABSTRACT

A sensor that includes a first resistor, a second resistor, a first circuit, and a second circuit. The first and second resistors each has a resistance that varies in response to a change in a physical property. The first circuit is electrically coupled to the first resistor and sets the resistance of the first resistor. The second circuit is electrically coupled to the second resistor and adjusts the resistance of the second resistor to equal the resistance of the first resistor. A processing circuit may be coupled to the first and second circuits to measure a difference in an amount of energy provided by the first and second circuits to the first and second resistors, respectively.

38 Claims, 10 Drawing Sheets

METHOD AND APPARATUS FOR BALANCING RESISTANCE

This application claims priority under 35 U.S.C. §119 (e) to U.S. provisional patent application Ser. No. 60/182,306, entitled "METHOD AND APPARATUS FOR BALANCING RESISTANCE," filed Feb. 14, 2000, which is incorporated herein by reference in its entirety.

FIELD OF THE INVENTION

The present invention is directed to resistance balancing, and more particularly to a mass flow sensor that is capable of detecting the mass flow rate of a fluid by balancing the resistance of upstream and downstream temperature sensors.

DESCRIPTION OF RELATED ART

Mass flow sensors are used in a wide variety of applications to measure the mass flow rate of a gas or other fluid. One application in which a mass flow sensor may be used is a mass flow controller. In a conventional mass flow controller, the mass flow rate of a fluid flowing in a main fluid flow path is regulated or controlled based upon a mass flow rate of a portion of the fluid that is diverted into a typically smaller conduit forming a part of the mass flow sensor. Assuming laminar flow in both the main flow path and the conduit of the sensor, the mass flow rate of the fluid flowing in the main flow path can be determined (and regulated or controlled) based upon the mass flow rate of the fluid flowing through the conduit of the sensor.

Two different types of mass flow sensors have traditionally been used, constant current mass flow sensors, and constant temperature mass flow sensors. An example of a constant current mass flow sensor is illustrated in FIG. 1. In FIG. 1, a fluid flows in a sensor pipe or conduit in the direction of the arrow X. Heating resistors or "coils" $R_1$ and $R_2$ having a large thermal coefficient of resistance are disposed about the sensor conduit on downstream and upstream portions of the sensor conduit, respectively, and are provided with a constant current I from a constant current source 901. As a result of the constant current I flowing through the coils $R_1$ and $R_2$, voltages $V_1$ and $V_2$ are developed across the coils. The difference between voltages $V_1$ and $V_2$ ($V_1-V_2$) is taken out of a differential amplifier 902, with the output of the amplifier 902 being proportional to the flow rate of the fluid through the sensor conduit.

At a zero flow rate, the circuit of FIG. 1 is configured so that the resistance value (and thus, the temperature) of coil $R_1$ is equal to the resistance value (and temperature) of coil $R_2$, and the output of the amplifier 902 is zero. As fluid flows in the sensor conduit, heat that is generated by coil $R_2$ and imparted to the fluid is carried towards $R_1$. As a result of this fluid flow, the temperature of coil $R_2$ decreases and that of coil $R_1$ increases. As the voltage dropped across each of these resistors is proportional to their temperature, voltage $V_1$ increases with an increased rate of fluid flow and voltage $V_2$ decreases, with the difference in voltage being proportional to the mass rate of flow of the fluid through the sensor conduit.

An advantage of a constant current mass flow sensor is that it can operate over a wide range of temperatures, is relatively simple in construction, and is responsive to changes in the ambient temperature of the fluid entering the sensor conduit. In this regard, as the ambient temperature of the fluid entering the sensor conduit changes, so does the resistance of each of the coils $R_1$ and $R_2$. However, it takes a relatively long time for the temperature (and thus, the resistance) of the coils $R_1$ and $R_2$ to stabilize in response to a change in the rate of flow of the fluid.

The other type of mass flow sensor that is frequently used is a constant temperature mass flow sensor, examples of which are illustrated in FIGS. 2–4. As shown in the constant temperature mass flow sensor of FIG. 2, heating resistors or "coils" $R_{1a}$ and $R_{1b}$ are respectively disposed about the downstream and upstream portions of a sensor conduit through which a fluid flows in the direction of the arrow X. As in the constant current mass flow sensor of FIG. 1, each of the downstream and upstream coils $R_{1a}$ and $R_{1b}$ has a large thermal coefficient of resistance. The resistance (and thus the temperature) of each of the coils $R_{1a}$, $R_{1b}$ is fixed by separate and independent circuits to the same predetermined value that is governed by the value of resistors $R_{2a}$, $R_{3a}$, $R_{4a}$, and $R_{2b}$, $R_{3b}$, $R_{4b}$, respectively. Control circuitry is provided to maintain each of the coils $R_{1a}$, $R_{1b}$ at the same predetermined value of resistance (and thus, temperature) independently of the rate of fluid flow through the sensor conduit.

In the absence of fluid flow, the circuit of FIG. 2 is configured so that the resistance (and temperature) of each of the downstream and upstream coils $R_{1a}$ and $R_{1b}$ is set to the same predetermined value and the output of the circuit is zero. As fluid flows in the sensor conduit, heat from the upstream coil $R_{1b}$ is carried towards $R_{1a}$. As a result, less energy is required to maintain the downstream coil $R_{1a}$ at the fixed temperature than is required to maintain the upstream coil $R_{1b}$ at that same fixed temperature. The difference in energy required to maintain each of the coils $R_{1a}$, $R_{1b}$ at the predetermined temperature is measured and is proportional to the mass flow rate of fluid flowing through the sensor conduit.

The constant temperature mass flow sensor described with respect FIG. 2 is also relatively easy to construct. In addition, the circuit of FIG. 2 stabilizes more quickly in response to changes in the mass flow rate of the fluid entering the sensor conduit than the constant current mass flow sensor described with respect to FIG. 1. However, because each of the coils $R_{1a}$ and $R_{1b}$ is set and maintained at a predetermined temperature independently of the ambient temperature of the fluid flowing into the sensor conduit, a problem arises when the ambient temperature of the fluid flowing into the sensor conduit increases. In particular, when the ambient temperature of the fluid flowing in the sensor conduit approaches the predetermined temperature that is maintained by the upstream and downstream coils, the circuit loses its ability to discern differences in the flow rate of the fluid, and when the ambient temperature of the fluid increases beyond this predetermined temperature, the sensor is rendered inoperable.

To overcome these disadvantages, a number of alternative constant temperature mass flow sensors have been provided. For example, the circuit of FIG. 3 provides a constant temperature mass flow sensor that is capable of responding to changes in the ambient temperature of a gas or fluid, at least to a certain degree. Once again, $R_{1b}$ and $R_{2b}$ are downstream and upstream temperature sensing coils with a large temperature coefficient of resistance. However, rather than maintaining the temperature of the coils at a predetermined constant value as in the circuit of FIG. 2, the circuit of FIG. 3 maintains the temperature of the sensor coils $R_{1b}$, $R_{2b}$ at a temperature that is above the ambient temperature of the fluid flowing into the sensor conduit. This is achieved by the insertion of an additional coil $R_{3b}$, $R_{4b}$ having a coefficient of resistance similar to that of the sensor coils $R_{1b}$, $R_{2b}$ in each of the downstream and upstream circuits. As the ambient temperature of the fluid changes, the series addition of coil resistance $R_{3b}$, $R_{4b}$ to the temperature setting resistors $R_{5b}$, $R_{6b}$ results in raising the temperature to which the upstream and downstream resistance coils are maintained above the ambient temperature of the fluid flowing into the sensor conduit. As in the circuit of FIG. 2, the difference in energy supplied by each of the downstream and upstream circuits to maintain the temperature of the coils $R_{1b}$, $R_{2b}$ at the same temperature is proportional to the mass flow rate of the fluid through the sensor conduit.

As should be appreciated by those skilled in the art, for the circuit of FIG. 3 to operate properly, it is critical that the values and thermal characteristics of each element in the downstream circuit match that of the corresponding element in the upstream circuit. Thus, the resistance of the downstream and upstream coils $R_{1b}$, $R_{2b}$ must have the same value, and the same thermal coefficient of resistance. In addition, resistor $R_{3b}$ must have the same value and the same (ideally large) thermal coefficient of resistance as resistor $R_{4b}$, resistor $R_{5b}$ must have the same value and same (ideally zero) thermal coefficient of resistance as resistor $R_{6b}$, resistor $R_{7b}$ must have the same value and same (ideally zero) thermal coefficient of resistance as resistor $R_{10b}$, resistor $R_{9b}$ must have the same value and same (ideally zero) thermal coefficient of resistance as resistor $R_{8b}$, and amplifiers 911 and 912 must have the same operating and temperature characteristics.

Despite the addition of resistors $R_{3b}$ and $R_{4b}$, a problem with the circuit of FIG. 3 is that as the ambient temperature of the fluid flowing into the sensor conduit rises, the sensor becomes less accurate because the proportional difference between the temperature of the upstream and downstream coils relative to the temperature of the ambient fluid becomes smaller. Further, there is a problem due to drift in that the calibration of the sensor at one temperature does not necessarily allow its use at other ambient temperatures without some sort of compensation circuit.

To solve some of the aforementioned problems, U.S. Pat. No. 5,401,912 proposes a constant temperature rise (above ambient) mass flow sensor, an example of which is shown in FIG. 4. The circuit of FIG. 4 acts to maintain upstream and downstream sensor coils $R_2$, $R_1$ at a predetermined value above the ambient temperature of the fluid flowing into the sensor conduit. The circuit of FIG. 4 is identical to the circuit of FIG. 2, except that the fixed value resistors $R_{3a}$ and $R_{3b}$ of FIG. 2, which have an essentially zero thermal coefficient of resistance, are replaced with resistors $R_5$ and $R_6$, respectively, having a large and specific valued thermal coefficient of resistance. As a result of these changes, the circuit of FIG. 4 purportedly maintains a constant temperature rise over the ambient temperature of the fluid flowing into the sensor conduit. Such a mass flow sensor as is shown in FIG. 4 is therefore termed a constant temperature difference (over ambient) or a constant temperature rise (over ambient) mass flow sensor.

Each of the aforementioned constant temperature mass flow rate sensors utilizes separate and independent upstream and downstream circuits to set the temperature of the upstream and downstream coils to a particular value, or to a particular value over the ambient temperature of the fluid flowing into the sensor conduit. A disadvantage of each of these circuits is that they require a close matching of corresponding circuit elements (i.e., resistors, coils, and amplifiers) in the upstream and downstream circuits.

SUMMARY OF THE INVENTION

According to one embodiment of the present invention, a sensor is provided that includes a first resistor, a second resistor, a first circuit, and a second circuit. The first and second resistors each has a resistance that varies in response to a change in a physical property. The first circuit is electrically coupled to the first resistor and sets the resistance of the first resistor. The second circuit is electrically coupled to the second resistor and adjusts the resistance of the second resistor to equal the resistance of the first resistor. A processing circuit may be coupled to the first and second circuits to measure a difference in an amount of energy provided by the first and second circuits to the first and second resistors, respectively. Where the resistance of the first and second resistors varies in response to a change in temperature, and the first and second resistors are disposed about a conduit in which fluid flows, the sensor is capable of measuring a mass flow rate of the fluid flowing in the conduit.

According to another embodiment of the present invention, a mass flow sensor is provided. The sensor includes a first heat sensitive coil, a second heat sensitive coil, a first circuit, a second circuit, and a processing circuit. The first and second heat sensitive coils are disposed at spaced apart positions about a conduit through which a fluid flows, and each has a resistance that varies with temperature. The first circuit is electrically coupled to the first heat sensitive coil and sets the resistance of the first heat sensitive coil to a value that corresponds to a predetermined temperature. The second circuit is electrically coupled to the second heat sensitive coil and adjusts an amount of current provided to the second heat sensitive coil so that the resistance of the second heat sensitive coil equals the resistance of the first heat sensitive coil. The processing circuit is coupled to the first and second circuits and measures a difference in an amount of energy provided by the first and second circuits to the first and second heat sensitive coils, respectively.

According to a further embodiment of the present invention, a method of balancing a resistance of a first resistor and a resistance of a second resistor is provided. The resistance of the first and second resistors vary with temperature, and the method includes acts of setting the resistance of the first resistor to a first value and providing an amount of current to the second resistor so that the resistance of the second resistor matches the first value of the first resistor.

According to another embodiment of the present invention, a method of setting the resistance of a resistor is provided. The method includes acts of: (a) measuring an ambient temperature of a fluid flowing into a conduit about which the resistor is disposed, (b) incrementing the ambient temperature measured in act (a) by a predetermined amount to identify a temperature to which the resistor is to be set, (c) calculating a value of resistance corresponding the temperature identified in act (b), (d) determining a division ratio to be provided by a programmable voltage divider to force the resistance of the resistor to the value calculated in act (c), and (e) configuring the programmable voltage divider to provide the division ratio determined in act (d).

BRIEF DESCRIPTION OF THE DRAWINGS

Illustrative, non-limiting embodiments of the present invention are described by way of example with reference to the accompanying drawings, in which.

DETAILED DESCRIPTION

Embodiments of the present invention will be understood more completely through the following detailed description which should be read in conjunction with the attached drawings in which similar reference numbers indicate similar structures.

FIGS. 5, 6A, and 7–9 illustrate a number of different mass flow sensors according to various embodiments of the present invention. In each of FIGS. 5, 6A, and 7–9, the reference designator $R_1$ represents the upstream coil, and reference designator $R_2$ represents the downstream coil. As in the prior art, coils $R_1$ and $R_2$ are disposed at spaced apart positions about a sensor conduit (not shown) through which a fluid flows. As defined herein, the term fluid includes any material or combination of materials in a solid, liquid, or gaseous state. Each of coils $R_1$ and $R_2$ has a large and substantially identical thermal coefficient of resistance, such that the resistance of each coil $R_1$, $R_2$ varies with temperature.

Figure 1:
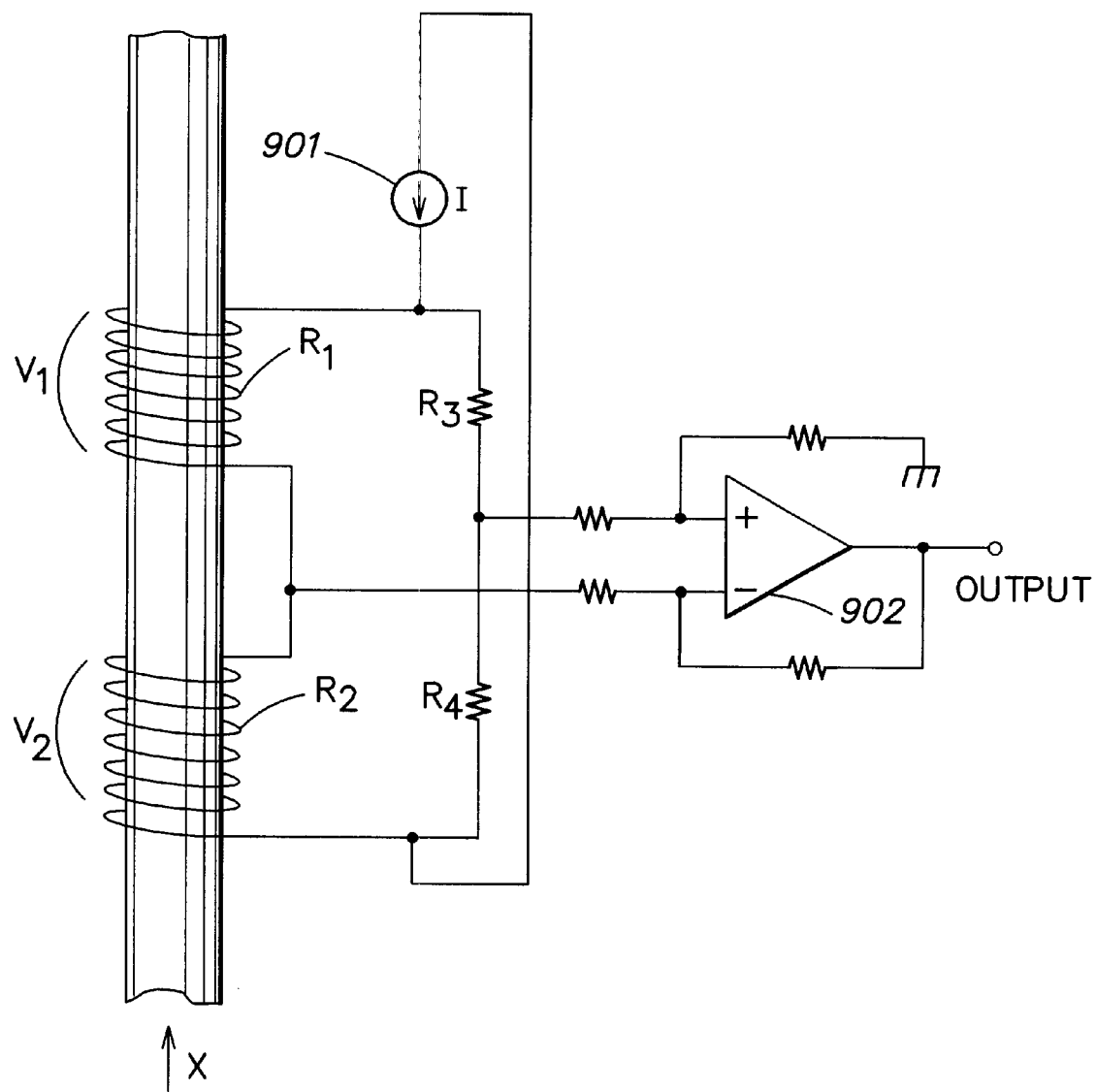
FIG. 1 is a constant current mass flow sensor according to the prior art.
Figure 2:
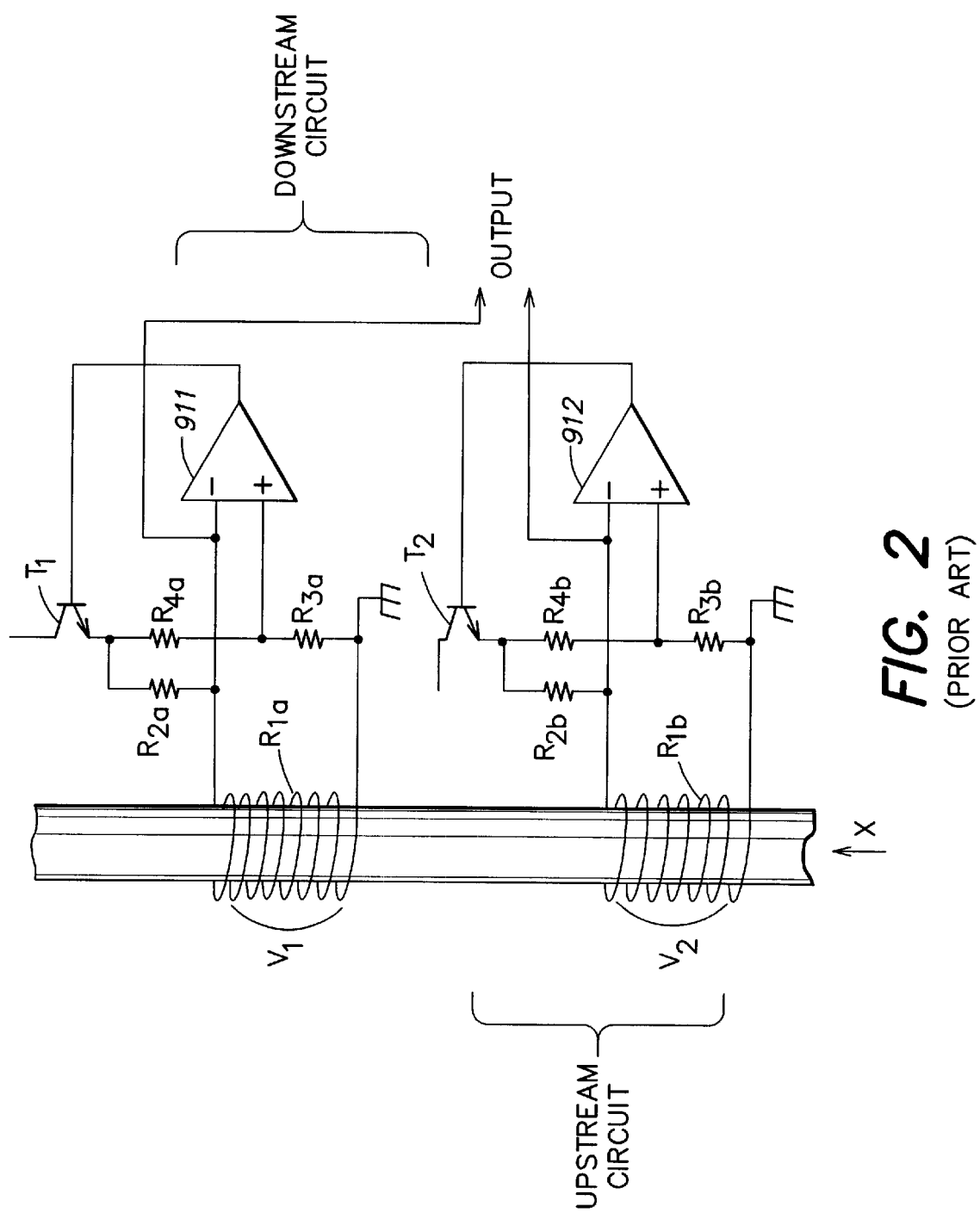
FIG. 2 is a constant temperature mass flow sensor according to the prior art.
Figure 3:
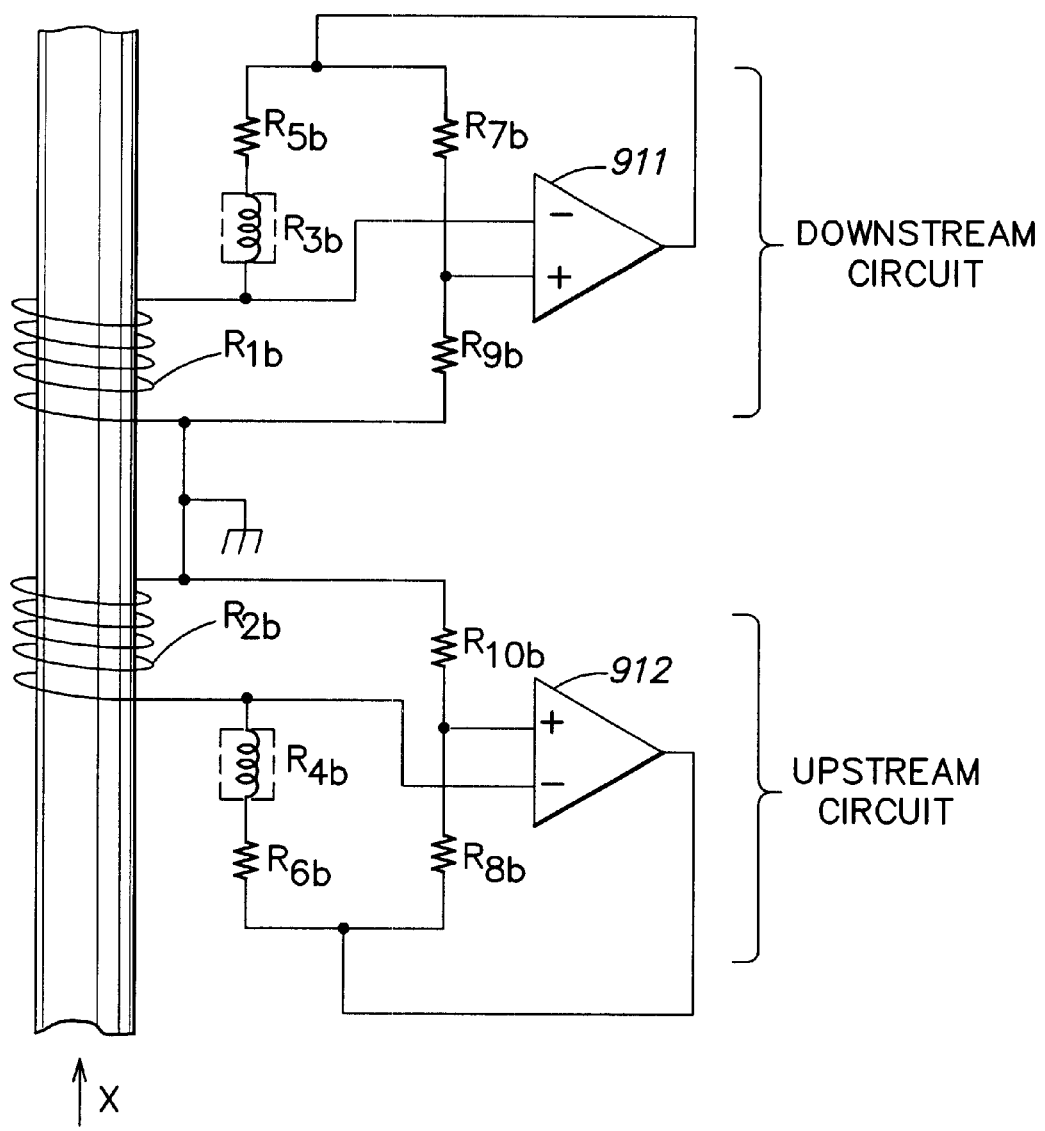
FIG. 3 is a constant temperature mass flow sensor that is capable of responding to changes in an ambient temperature of a fluid according to the prior art.
Figure 4:
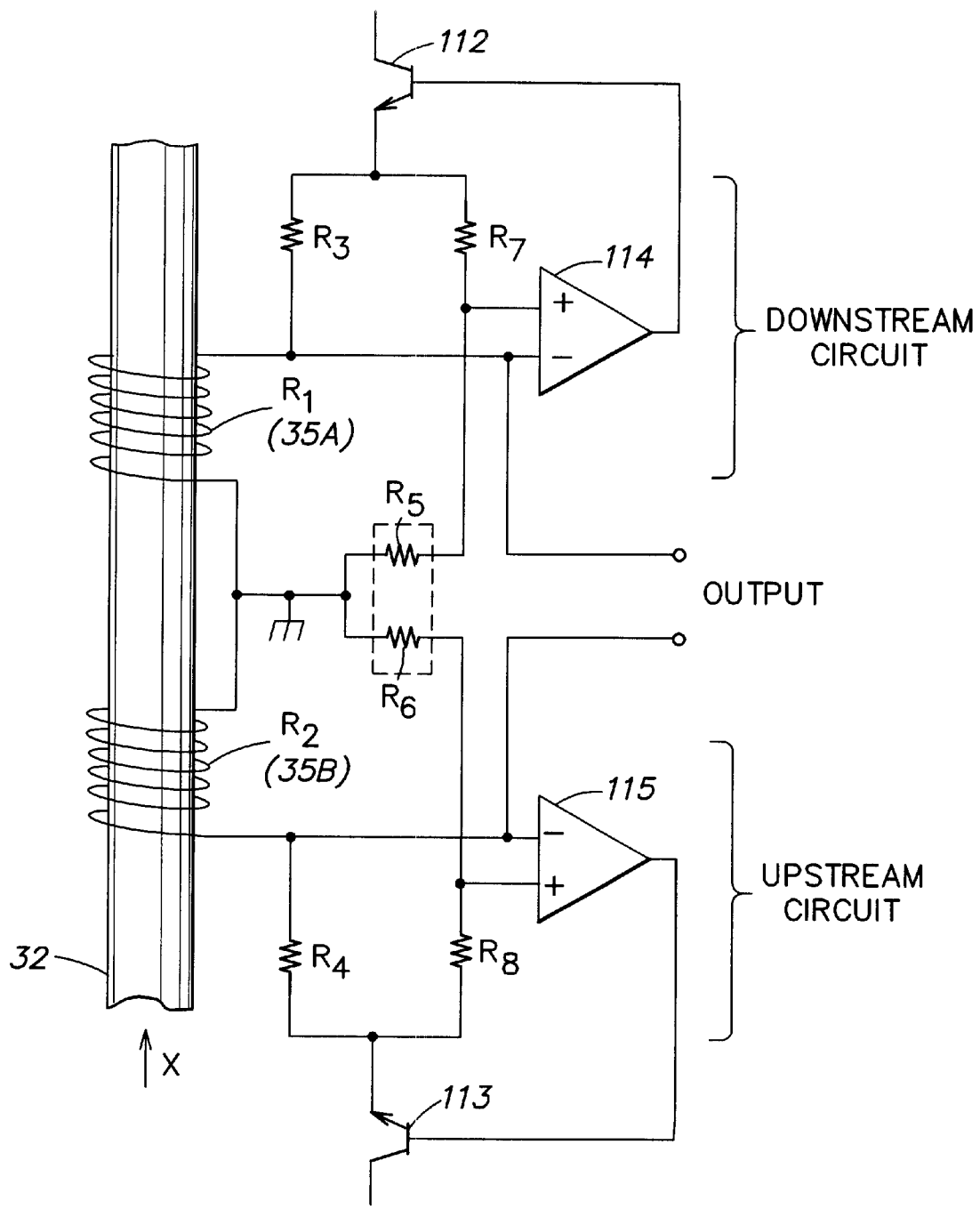
FIG. 4 is another constant temperature mass flow sensor that is capable of responding to changes in an ambient temperature of a fluid according to the prior art.

In contrast to the constant temperature mass flow sensors of FIGS. 2–4, mass flow sensors according to embodiments of the present invention do not use separate upstream and downstream circuits to independently set the temperature of the upstream and downstream coils to an identical value. Rather, embodiments of the present invention use a common circuit to set one of the upstream and downstream coils to a predetermined temperature or to a predetermined temperature above ambient, and then supply an amount of current to the other of the upstream and downstream coils to force the resistance, and thus, the temperature, of the upstream and downstream coils to be equal. As a result, embodiments of the present invention do not require the close matching of component values and characteristics that is required in the separate upstream and downstream circuits of FIGS. 2–4.

Figure 5:
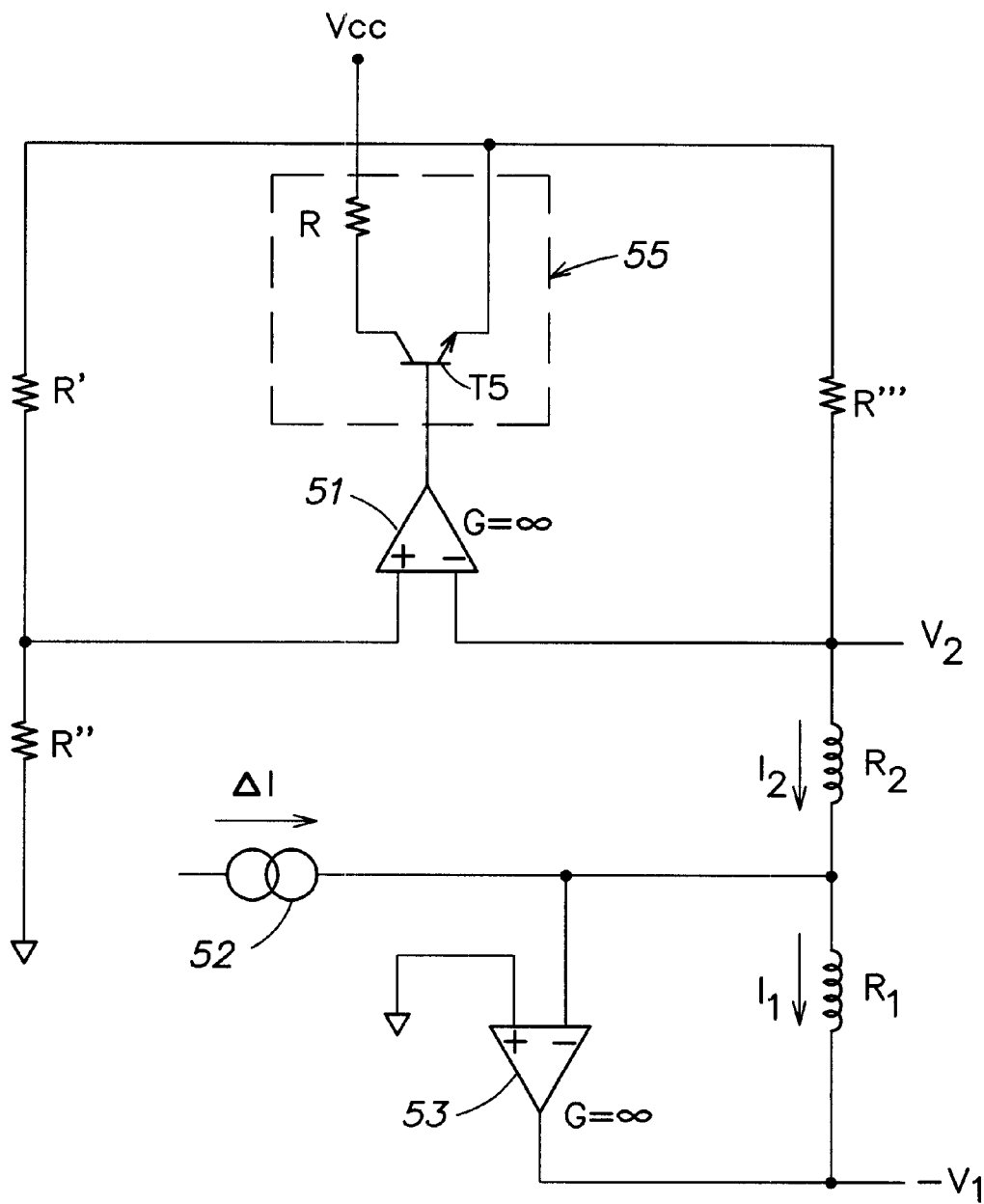
FIG. 5 is a constant temperature mass flow sensor according to one embodiment of the present invention.

FIG. 5 illustrates a simplified schematic diagram of a mass flow sensor according to one embodiment of the present invention. In broad overview, the circuit of FIG. 5 performs two main functions: setting the temperature of the downstream coil $R_2$ to a predetermined temperature, or to a predetermined temperature above the ambient temperature of the fluid flowing into the sensor conduit, and forcing the resistance value (and thus the temperature) of the upstream coil $R_1$ to equal that of the downstream coil $R_2$. In operation, the circuit of FIG. 5 makes the resistance of the upstream coil $R_1$ equal to the resistance of the downstream coil $R_2$, independently of the actual numeric value of resistance to which the downstream coil $R_2$ is set. It should be appreciated that the operation of the circuit of FIG. 5 may be reversed, such that the temperature of upstream coil $R_1$ is set to a predetermined temperature, or to a predetermined temperature above the ambient temperature of the fluid flowing into the sensor conduit, and the resistance value (and thus, the temperature) of the downstream coil $R_2$ is forced to equal that of the upstream coil $R_1$ As with the mass flow sensors of FIGS. 2–4, the difference in the amount of energy supplied to the upstream and downstream coils is proportional to the mass flow rate of the fluid flowing through the sensor conduit.

Referring to FIG. 5, current generated by a high gain operational amplifier 51 is provided to two different resistive branches of the circuit; a first resistive branch being formed by the series connection of R' and R", and a second resistive branch formed by the series connection of R'" and $R_2$. In the embodiment shown in FIG. 5, the output of the operational amplifier 51 is buffered by a transistor $T_5$ that is configured as an emitter-follower and connected to a supply voltage Vcc by a resistor R. The combination of transistor $T_5$ and resistor R operates as a buffer circuit 55. Other types of buffer circuits may also be used, as the present invention is not limited to any particular implementation of buffer circuit 55. Moreover, it should be appreciated that depending on the output capabilities of the operational amplifier 51, the use of a buffer circuit may be omitted. Accordingly, although a buffer circuit 55 is depicted in each of FIGS. 5, 6A, and 7–9, the present invention is not so limited.

One of the inputs of the operational amplifier 51 is connected between the series connection of R' and R" of the first resistive branch, and the other is connected between the series connection of R'" and $R_2$ of the second resistive branch. In the embodiment shown in FIG. 5, the non-inverting (+) input of operational amplifier 51 is connected to the midpoint of the first resistive branch, and the inverting (−) input of the operational amplifier 51 is connected to the midpoint of the second resistive branch. In an alternative embodiment (not shown), the non-inverting (+) input of operational amplifier 51 is connected to the midpoint of the second resistive branch, with the inverting (−) input of the operational amplifier 51 being connected to the midpoint of the first resistive branch.

Connected to coil $R_2$ are coil $R_1$, an adjustable current source 52 that provides an adjustable current $\Delta I$, and a high gain operational amplifier 53. The inverting (−) input of operational amplifier 53 is connected to coil $R_2$, coil $R_1$, and the adjustable current source 52. Because the non-inverting (+) input of operational amplifier 53 is coupled to ground, the connection point between coil $R_2$, coil $R_1$, and the adjustable current source 52 is also at ground potential (i.e., is a "virtual ground"). Although not illustrated in FIG. 5, a buffer circuit similar to buffer circuit 55 may be connected between the output of operational amplifier 53 and coil $R_1$, or alternatively, the operational amplifier 53 may include a buffered output stage.

The connection of the respective inputs of the operational amplifier 51 to the midpoint of each resistive branch, and the coupling of coil $R_2$ to a virtual ground forces the voltage at the midpoint of each resistive branch to be equal, with the result that $R'/R''=R'''/R_2$. Thus, the first resistive branch of $R'$ and $R''$ acts as a voltage divider that sets the ratio of $R'''/R_2$.

By adjusting the value of the ratio $R''/R'$, the resistance, and thus, the temperature of coil $R_2$ may be set to any desired value. In one embodiment, resistor $R''$ includes a programmable resistor having a resistance value that is calculated to set the resistance, and thus, the temperature of coil $R_2$ to a predetermined value above the ambient temperature of the fluid flowing into the sensor conduit. Preferably, the temperature of coil $R_2$ is set approximately 30° to 100° C. above the ambient temperature of the fluid flowing into the sensor conduit, although the present invention is not limited to a particular value. In another embodiment, resistor $R''$ includes a resistor having a high thermal coefficient of resistance, such that when the ambient temperature of the fluid flowing into the sensor conduit changes, the resistance, and thus the temperature, of coil $R_2$ changes in a proportional manner. Of course it should be appreciated that because $R_2 = (R'' \; R''')/R'$, one or more of resistors $R'$, $R''$, and $R'''$ could alternatively include a variable or temperature dependent resistor. As described in detail further below, in a further embodiment of the present invention, the series combination of $R'$ and $R''$ may be replaced by a programmable voltage divider that includes a digital to analog converter to set the resistance of coil $R_2$ to the desired value.

In operation, the circuit of FIG. 5 injects an amount of current $\Delta I$ to maintain the resistance, and thus, the temperature of coil $R_1$ equal to that of coil $R_2$. As a result, the following equations hold:

$$R_1 = V_1/I_1 \qquad (1)$$

$$R_2 = V_2/I_2 \qquad (2)$$

$$I_1 = \Delta I + I_2 \qquad (3).$$

Accordingly, $$\Delta I/I_2 = (V_1 - V_2)/V_2 \qquad (4).$$

Thus, when the resistance (and thus, the temperature) of coil $R_1$ is equal to the resistance (and thus, the temperature) of coil $R_2$, the ratio of $\Delta I/I_2$ is equal to the difference between $V_1$ and $V_2$, divided by $V_2$, which is proportional to the mass flow rate of the fluid flowing through the sensor conduit.

As in the circuit of FIGS. 2–4, the output voltages $V_1$ and $V_2$ may be provided to other processing circuits (not shown) that calculate, monitor, display, or regulate the mass flow rate of the fluid, based upon the values of output voltages $V_1$ and $V_2$. For example, output voltages $V_1$ and $V_2$ may be provided to the inputs of an amplifier, with the output of the amplifier and the output voltage $V_2$ being provided to a division circuit that forms the ratio $(V_1-V_2)/V_2$. As these other processing circuits are well known and understood by those skilled in the art, the details of such processing circuits are omitted herein.

Advantageously, the circuit of FIG. 5 dispenses with the need for the close matching of corresponding components in separate upstream and downstream circuits that is required by the constant temperature and the constant temperature rise (above ambient) mass flow sensors of the prior art. For example, in each of the temperature sensors of FIGS. 2–4, because the resistance (and temperature) of the upstream and downstream coils are set to a particular numeric value by separate and independent upstream and downstream circuits, corresponding components in the upstream and downstream circuits must match and must vary in the same manner with respect to changes in the ambient temperature of the fluid. Any mismatch in component values and characteristics will be interpreted as a change in the rate of fluid flow. Thus, in the sensor of FIG. 4, $R_1$ must equal $R_2$, $R_3$ must equal $R_4$, $R_5$ must equal $R_6$, $R_7$ must equal $R_8$, the electrical characteristics of transistor 112 and differential amplifier 114 must match those of transistor 113 and differential amplifier 115, and the thermal characteristics of all components in the upstream circuit must match their corresponding components in the downstream circuit. In practice, such close matching of component values and characteristics is difficult to obtain, even with the use of precise (and expensive) components.

In contrast to the constant temperature mass flow sensors of the prior art, the mass flow sensor of FIG. 5 does not require a close matching of circuit components. In particular, as long resistor $R'''$ is stable over temperature, and as long as the ratio of $R'$ to $R''$ is also stable over temperature (e.g., as long as the ratio $R'/R''=K$, where K is a constant), the actual resistance values of resistors $R'$, $R''$, and $R'''$ are not critical. Furthermore, the circuit of FIG. 5, does not require that the downstream and upstream coils $R_1$, $R_2$ be identical, as such identity is difficult to obtain in practice, and the actual temperature of coils $R_1$ and $R_2$ need not be identical at the same resistance value, as long as the difference in temperature between the two coils at the same resistance value is relatively constant for different values of resistance.

Figure 6A:
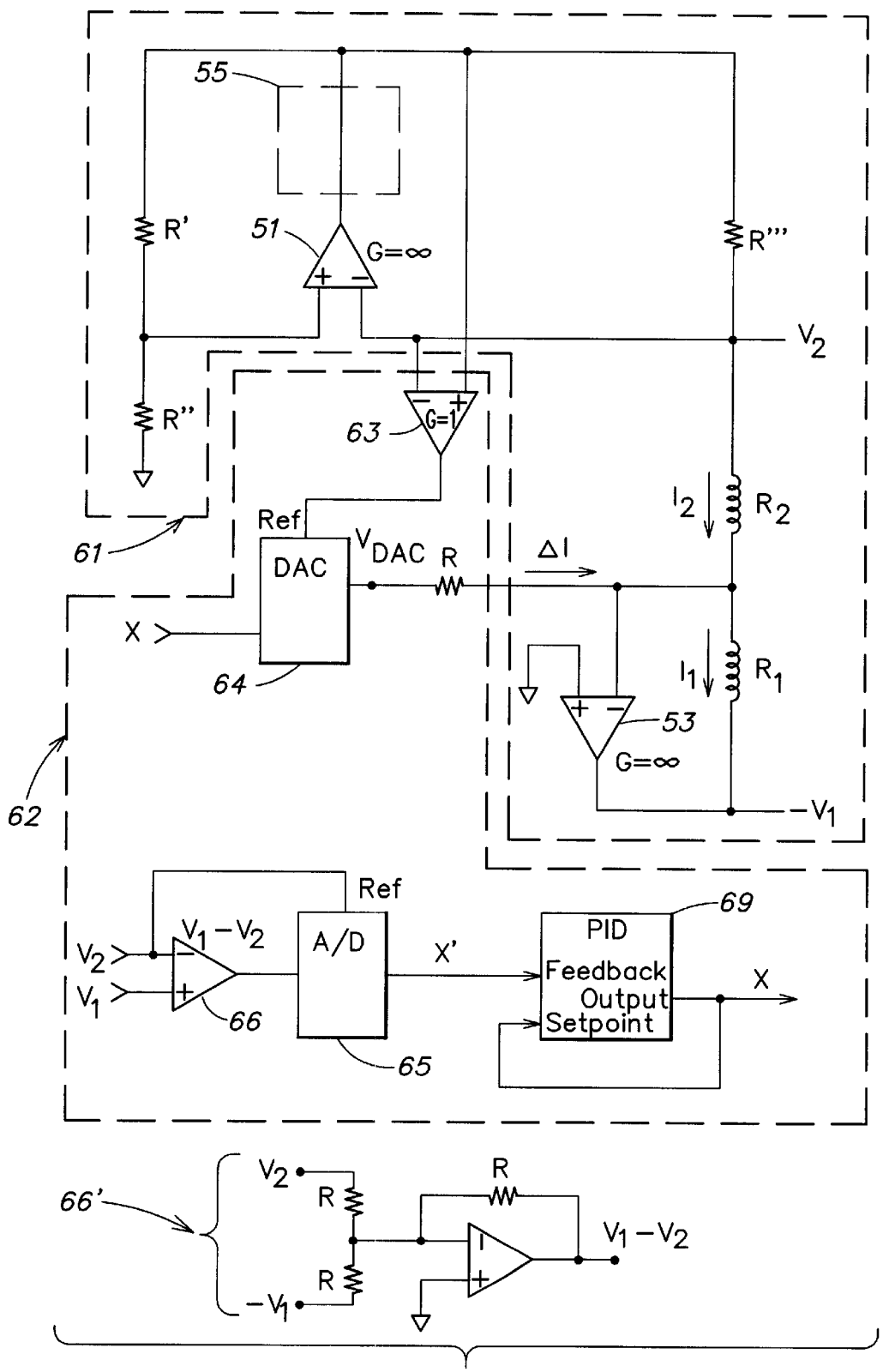
FIG. 6A is a constant temperature mass flow sensor according to another embodiment of the present invention.

FIG. 6A illustrates a schematic diagram of a mass flow sensor according to another embodiment of the present invention. In FIG. 6A, that portion of the circuit designated by reference numeral 62 corresponds to one exemplary implementation of adjustable current source 52 in FIG. 5. The remaining portion of the circuit bearing reference numeral 61 corresponds to the remainder of the circuit in FIG. 5.

In a manner similar to that described with respect to FIG. 5, buffer 55 (which may include the emitter-follower circuit shown in FIG. 5) provides current generated by operational amplifier 51 to two resistive branches of the circuit; the first resistive branch including resistors R' and R", and the second resistive branch including resistor R'" and coil $R_2$. As in the circuit of FIG. 5, one of the inputs of high gain operational amplifier 51 is connected between the series connection of R' and R" of the first resistive branch, with the other being connected between the series connection of R'" and $R_2$ of the second resistive branch. Connected to coil $R_2$ are coil $R_1$ and the inverting (−) input of high gain operational amplifier 53, with the non-inverting (+) input of operational amplifier 53 being coupled to ground. As in the circuit of FIG. 5, the connection of the respective inputs of the operational amplifier 51 to the midpoint of each resistive branch, and the coupling of coil $R_2$ to a virtual ground forces the voltage at the midpoint of each resistive branch to be equal, with the result that R'/R"=R'"/$R_2$. Once again, the series connection of R' and R" acts as a voltage divider, and by adjusting the value of R", the resistance, and thus, the temperature of coil $R_2$ may be set to any desired value.

In the embodiment illustrated in FIG. 6A, adjustable current source 52 (FIG. 5) includes a unity gain instrumentation amplifier 63, a Digital to Analog Converter (DAC) 64, a unity gain operational amplifier 66, an Analog to Digital Converter (A/D) 65, and a proportional/integral/differential (PID) controller 69.

Inverting (−) input of instrumentation amplifier 63 is connected to the inverting (−) input of operational amplifier 51 and voltage $V_2$, and the non-inverting (+) input of instrumentation amplifier 63 is connected to the output of buffer 55. As a result of these connections, the output ($V_{Ref}$) of instrumentation amplifier 63 that is provided as the reference voltage input to DAC 64 is given by the following equation:

$$V_{Ref}=[(V_2+I_2R''')-V_2]=I_2R''' \quad (5).$$

As known to those skilled in the art, the output voltage ($V_{DAC}$) of a digital to analog convertor is governed by the following relationship:

$$V_{DAC}=[V_{Ref}*X]/2^n \quad (6),$$

where $V_{Ref}$ is the voltage reference input provided to the DAC, X is a digital input word provided to the DAC, and $2^n$ is the maximum permitted value of the input word X.

Accordingly, in FIG. 6A the output voltage provided by DAC 64 is given by the following equation:

$$V_{DAC}=[I_2R'''*X]/2^n \quad (7).$$

Because the value of the current ΔI that is supplied by the adjustable current source 62 is equal to $V_{DAC}/R$, the following equation holds true when R'"=R:

$$\Delta I/I_2 = X/2^n \quad (8).$$

Referring now to the lower portion of FIG. 6A, a circuit is provided for generating a binary word X, that when provided as an input to DAC 64, causes the output of DAC 64 to provide an appropriate amount of current (ΔI) to coil $R_1$ so that the resistance of coil $R_1$ equals that of coil $R_2$. As shown in FIG. 6A, the non-inverting (+) input of operational amplifier 66 receives voltage $V_1$ and the inverting (−) input of operational amplifier 66 receives voltage $V_2$. The voltage $V_2$ is also provided as a reference voltage to the reference voltage input of A/D 65. Operational amplifier 66 therefore provides an output that is equal to the difference of $V_1$ and $V_2$ to the input of the A/D 65. A more detailed implementation of a circuit for providing the difference between $V_1$ and $V_2$ (i.e., $V_1-V_2$) is illustrated in FIG. 6A by reference designator 66'.

As known to those skilled in the art, the binary output word X of an analog to digital convertor (A/D) is governed by the following relationship:

$$X=Y2^n/V_{Ref} \quad (9)$$

where $V_{Ref}$ is the voltage reference input provided to the A/D, Y is the analog input voltage provided to the A/D, and $2^n$ is the maximum permitted binary value of the output word X. Accordingly, in FIG. 6A, the binary output word generated by the A/D 65 is given by the following equation:

$$X=(V_1-V_2)2^n/V_2 \quad (10).$$

Substituting equation (10) into equation (8) yields the following:

$$\Delta I/I_2=[(V_1-V_2)2^n/V_2]/2^n=(V_1-V_2)/V_2 \quad (11)$$

which is the same as equation 4. Thus, the A/D 65 generates a binary number X representing the ratio of $V_1-V_2$ to $V_2$, which, when provided to the input of DAC 64 after some additional processing, generates an appropriate amount of current ΔI to coil $R_1$ so that the resistance of coil $R_1$ equals that of coil $R_2$.

As will be appreciated by those skilled in the art, when the number X is directly supplied as an input to DAC 64, the circuit of FIG. 6A will tend to be unstable. In particular, when going from a zero fluid flow state to a non-zero fluid flow state, and vice versa, the output X provided by the A/D 65 will cause the resistance of coil $R_1$ to diverge from that of $R_2$. To correct this problem, the output (shown as X' in FIG. 6A) from A/D 65 may be input to a proportional/integral/differential (PID) controller 69, with the output of the PID controller 69 being provided to the input X of DAC 64. In the circuit of FIG. 6A, the output X' of A/D 65 is provided to the feedback input of PID controller 69, with the output of the PID controller 69 being connected to the setpoint input of the PID controller 69. As the use and construction of a PID controller and similar types of control circuits are well known to those skilled in the art, further discussion of the PID controller 69 is omitted herein.

It should be appreciated that because the circuit of FIG. 6A forces the ratio of $\Delta I/I_2$ to be equal to the difference of $V_1$ and $V_2$ divided by $V_2$, the circuit of FIG. 6A allows one to detect drift in the mass flow sensor. In particular, for a given change in ΔI, the quantity $(V_1-V_2)/V_2$ changes proportionally, irrespective of the flow rate and ambient temperature of the fluid flowing into the sensor conduit. If at a time $T_1$, a change in $\Delta I$ results in a particular value of change in the quantity $(V_1-V_2)/V_2$, and at a later time $T_2$, that same change in $\Delta I$ results in a different value of change in the quantity $(V_1-V_2)V_2$, it may be determined that the mass flow sensor has drifted. This is significant because in a typical mass flow sensor, it is nearly impossible to determine the difference between drift in the sensor and a change in the detected amount of flow. It should be appreciated that because it is possible to detect drift in the mass flow sensor circuit of FIG. 6A, a number of corrective actions may be taken. For example, upon the detection of drift in the sensor, an alert condition may be set to notify personnel that the sensor has drifted. The sensor may then be returned to the manufacturer for re-calibration. Alternatively, upon the detection of drift in the sensor, a correction factor may be supplied to compensate for the drift.

Figure 6B:
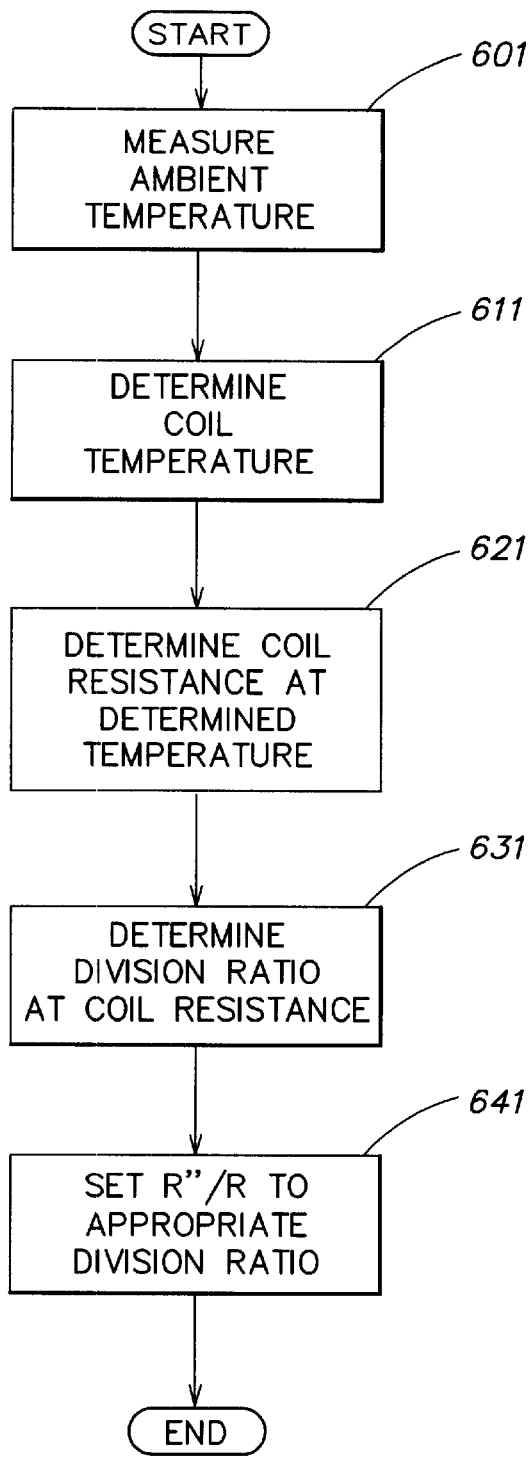
FIG. 6B is a flowchart of a temperature setting routine that may be used with the constant temperature mass flow sensor of FIG. 6A.

A flowchart of an exemplary temperature setting routine that may be used with the constant temperature mass flow sensor of FIG. 6A is now described with respect to FIG. 6B. As known to those skilled in the art, mass flow sensors frequently form but a portion of a mass flow controller. Other portions of the mass flower controller typically include one or more valves, a main flow path, and a processor (e.g., a CPU) that monitors and regulates the valves to control the amount of fluid flowing through the main flow path, according to the mass flow rate determined by the mass flow sensor.

According to one embodiment of the present invention, a temperature setting routine is provided that may be implemented in software that executes on a processor of a mass flow controller to set the value of resistance of one of the upstream $R_1$ and downstream $R_2$ coils of the sensor. After setting one of the upstream $R_1$ and downstream $R_2$ coils of the sensor to a particular value, the resistance balancing sensor circuits described with respect to FIGS. 5 and 6A may be used to equalize the resistance of the other one of the upstream $R_1$ and downstream $R_2$ coils of the sensor. By then detecting the difference in the amount of energy supplied to each of the upstream $R_1$ and downstream $R_2$ coils when their resistance is equal, the mass flow rate of the fluid flowing in the conduit of the sensor, and thus, the mass flow rate of the fluid flowing in the main flow path may be determined. It should be appreciated that the temperature setting routine described below need not be implemented in software, but may alternatively be implemented by a dedicated state machine or other control logic. Moreover, it should also be appreciated that the temperature setting routine of FIG. 6B may be modified to set the temperature of one of the upstream $R_1$ and downstream $R_2$ coils to a predetermined temperature, rather than to a predetermined temperature above the ambient temperature of the fluid entering the sensor conduit.

At step 601 the temperature setting routine measures the ambient temperature of the fluid entering into the sensor conduit. This step may be performed, for example, by monitoring a thermometer (not shown) that is in thermal contact with the fluid entering into the sensor conduit, by monitoring a thermometer that is in thermal contact with the main fluid path, etc. After measuring the ambient temperature of the fluid entering into the sensor conduit, the routine proceeds to step 611, wherein the routine determines a temperature to which one of the upstream $R_1$ or downstream $R_2$ coils is set. For example, in the embodiment of FIG. 6A, where the downstream coil $R_2$ is set to a predetermined temperature based upon the value of $R_2=(R'' R''')/R'$, and the amount of current $\Delta I$ is adjusted to set the resistance of the upstream coil $R_1$ equal to that of the downstream coil $R_2$, the temperature to which the downstream coil $R_2$ is set may be based upon the following relationship:

$$T=T_{Ambient}+T_{Rise}, \quad (12)$$

where $T_{Ambient}$ is the ambient temperature measured in step 601, and $T_{Rise}$ is a fixed value, such as 30° to 100° C. In general the value of $T_{Rise}$ should be at least several tens of degrees higher than the ambient temperature of the fluid entering into the sensor conduit, but not so high that it would create a problem with highly reactive fluids.

After determining the temperature to which the downstream coil $R_2$ is set in step 611, the routine proceeds to step 621. At step 621, the routine determines the appropriate value of resistance to which the downstream coil $R_2$ should be set based on the temperature of the coil (e.g., $R_2$) determined in step 611. As known to those skilled in the art, a second order approximation of the resistance of the coil is given by the following relationship:

$$R_{coil}=R_0(1+\alpha T+\beta T) \quad (13)$$

where $R_0$ is the resistance of the coil ($R_2$) at 0° C., $\alpha$ and $\beta$ are constants, and T is the desired temperature of the coil determined at step 611. After determining the coil resistance at step 621, the routine proceeds to step 631, wherein a division ratio that is to be set by the ratio of $R''/R'$ is determined. As described above with respect to FIG. 6A, the division ratio may be set by adjusting the resistance of one or more variable resistors, by using a programmable voltage divider circuit that includes a Digital to Analog Converter (DAC), or in other ways known to those skilled in the art. For example, the series combination of R' and R" may be replaced by a DAC (not shown) having a voltage reference input that receives the output of buffer circuit 55, an output that is coupled to the non-inverting (+) input of operational amplifier 51, and an input that receives an appropriately valued input word X to provide the desired division ratio.

After determining the division ratio that is needed to set the resistance value of coil $R_2$ to the determined value, the routine proceeds to step 641, wherein the value of the ratio $R''/R'$ determined at step 631 is set, and the routine terminates.

Figure 7:
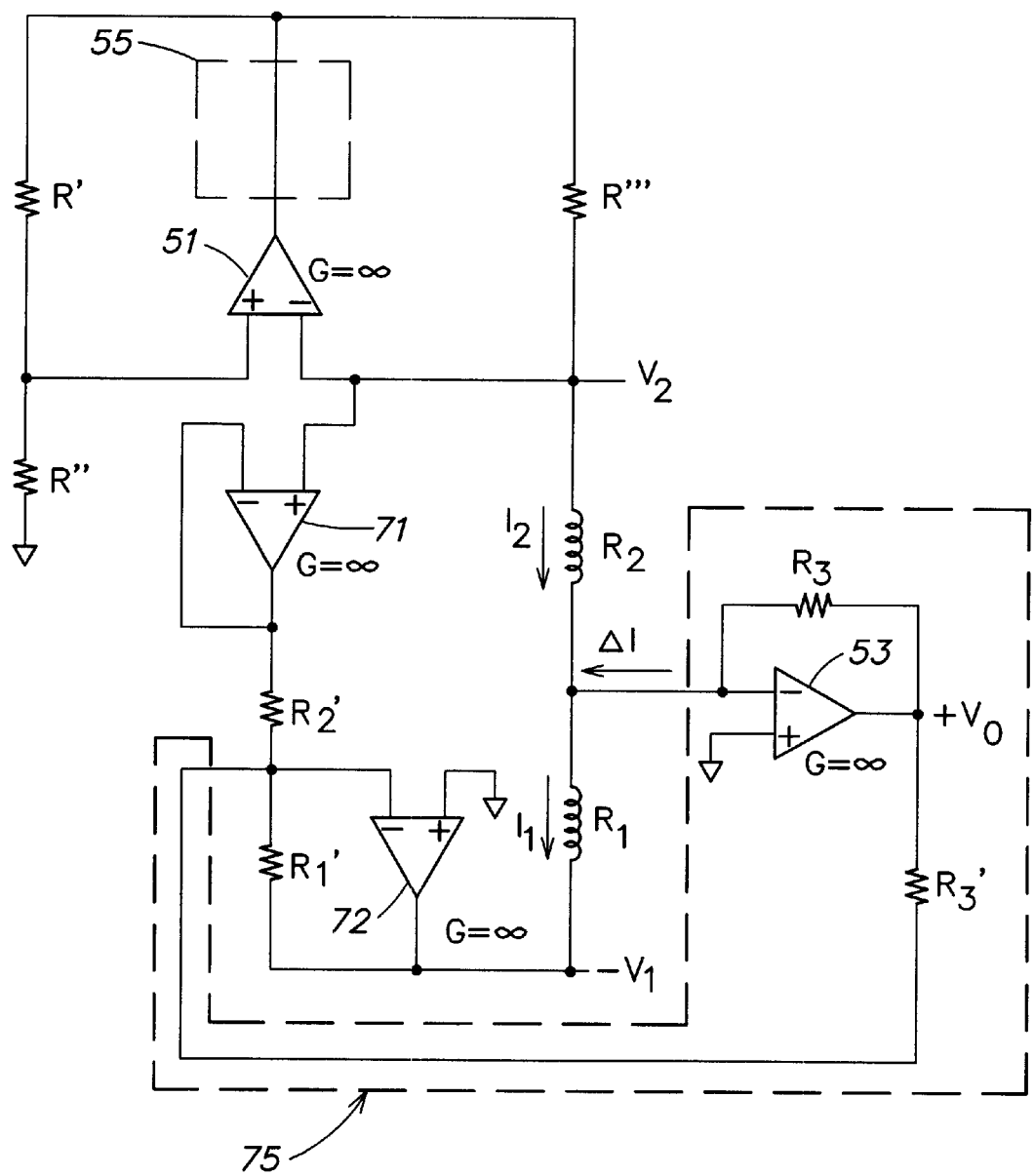
FIG. 7 is a constant temperature mass flow sensor according to yet another embodiment of the present invention.

FIG. 7 illustrates a mass flow sensor according to another embodiment of the present invention. In contrast to the mass flow sensor of FIG. 6A, the mass flow sensor of FIG. 7 does not use a computational circuit to set the amount of current $\Delta I$ that is provided by the adjustable current source (e.g., adjustable current source 62 in FIG. 6A). Instead, the circuit of FIG. 7 balances currents in various resistive branches of the circuit to maintain the upstream coil $R_1$ and the downstream coil $R_2$ at the same resistance value.

In a manner similar to that described with respect to FIGS. 5 and 6A, current from operational amplifier 51 is again provided to two resistive branches of the circuit via buffer 55; the first resistive branch including resistors R' and R", and the second resistive branch including resistor R'" and coil $R_2$. As in the circuits of FIGS. 5 and 6, one of the inputs of high gain operational amplifier 51 is connected between the series connection of R' and R" of the first resistive branch, with the other being connected between the series connection of R'" and $R_2$ of the second resistive branch. Connected to coil $R_2$ are coil $R_1$ and the inverting (−) input of high gain operational amplifier 53, with the non-inverting (+) input of operational amplifier 53 being coupled to ground. As in the circuit of FIGS. 5 and 6, the connection of the respective inputs of the operational amplifier 51 to the midpoint of each resistive branch, and the coupling of coil $R_2$ to a virtual ground forces the voltage at the midpoint of the first resistive branch to be equal to the voltage at the midpoint of the second resistive branch, with the result that R'/R"=R'"/$R_2$. Once again, the series connection of R' and R" acts as a voltage divider, and by adjusting the value of R", the resistance, and thus, the temperature of coil $R_2$ may be set to any desired value.

In contrast to the circuit of FIG. 6A, the circuit of FIG. 7 includes a large gain operational amplifier 71 having a non-inverting (+) input that is connected to the inverting (−) input of operational amplifier 51, and an inverting (−) input that is fed back from the output of the operational amplifier 71. In operation, the operational amplifier 71 acts as a buffer to mirror the voltage $V_2$ and provide this voltage to $R_2'$. Connected to the midpoint of a third resistive branch formed by $R_2'$ and $R_1'$ is a high gain operational amplifier 72. The inverting (−) input of operational amplifier 72 is connected to the midpoint of the third resistive branch, with the non-inverting (+) input of operational amplifier 72 being coupled to ground. The output of operational amplifier 72 is fed back through $R_1'$ and is also connected to coil $R_1$. A fourth resistive branch is formed by the series connection of $R_2$ and $R_1$. Operational amplifier 72 acts to force the voltage at the midpoint of the third resistive branch formed by $R_2'$ and $R_1'$ to be equal to that at the midpoint of the fourth resistive branch formed by $R_2$ and $R_1$, with the result that the same proportional currents flow in $R_2'$ and $R_2$ and in $R_1'$ and $R_1$. As a result, the ratio of $R_2'/R_1'=R_2/R_1$.

The remaining portion of the circuit of FIG. 7 designated by reference numeral 75 functions as an adjustable current source to provide an amount of current $\Delta I$ to the upstream coil $R_1$ so that the resistance of coil $R_1$ is equal to that of coil $R_2$. As shown, resistor $R_3$ is connected between the inverting (−) input and the output of operational amplifier 53, resistor $R_3'$ is connected between the output of operational amplifier 53 and the midpoint of the third resistive branch formed by $R_2'$ and $R_1'$, and the non-inverting (+) input of operational amplifier 53 is coupled to ground.

The current at the midpoint of the fourth resistive branch formed by $R_2$ and $R_1$ is governed by the following relationship:

$$I_2+\Delta I - I_1 = 0 \quad (14).$$

As $-V_o=\Delta I R_3$; $V_2=I_2 R_2$; and $V_1=I_1 R_1$; substituting these relationships into equation 14 yields the following relationship when $R_1=R_2=R$:

$$V_o=(V_2/R_2-V_1/R_1)*R_3=(V_2-V_1)*R_3/R \quad (15);$$

and $$\Delta I/I_2=(V_2-V_1)/V_2 \quad (16),$$

which is the same relationship as that shown in equations 4 and 11.

As noted above, the circuit of FIG. 7 operates to provide an amount of current $\Delta I$ to the upstream coil $R_1$ so that the resistance of upstream coil $R_1$ is equal to that of the downstream coil $R_2$. It should be appreciated that as the output $V_o$ of operational amplifier 53 changes, the circuit of FIG. 7 remains in balance as long as the ratio of $R_1/R_1'= R_2/R_2'=R_3/R_3'=K$, where K is a constant. Thus, in contrast to the constant temperature mass flow sensors of the prior art, the circuit of FIG. 7 does not require the close matching of component values, as long as their ratios are equal and stable over temperature.

It should be appreciated that the circuit of FIG. 7 may be modified in a number of ways, without departing from the basic operation of the circuit. For example, high gain operational amplifier 71 may be replaced by a unity gain buffer. Alternatively, high gain operational amplifier 71 could be eliminated and resistor $R_2'$ connected directly to the inverting (−) input of operational amplifier 51, such that the ratio of R'/R" is equal to R'" divided by the parallel combination of $R_2$ and $R_2'$. Moreover, in FIG. 7, as well as in FIGS. 5 and 6A, those connections that are shown as being coupled directly to ground may alternatively be coupled to ground through one or more resistors. It should also be appreciated that, as operational amplifiers 72 and 53 function to maintain the midpoints of the third and fourth resistive branches at a particular level, other circuit topologies may be used to achieve a similar result. For example, instead of the non-inverting (+) input of operational amplifier 72 being coupled to ground, this input may instead be connected to the midpoint of the fourth resistive branch formed by coils $R_2$ and $R_1$, or alternatively, the non-inverting (+) input of operational amplifier 53 may instead be connected to the midpoint of the third resistive branch formed by resistors $R_2'$ and $R_1'$. Each of these alternative configurations force the midpoints of the resistive branches to a known level that need not be at a ground potential. In addition, each of these alternative configurations help to reduce offset errors due to differences between operational amplifiers 53 and 72, although they may tend to make the circuit less stable.

The mass flow sensor of FIG. 7 is a constant temperature mass flow sensor, rather than a constant temperature rise (above ambient) sensor like that of FIG. 6A. As such, the circuit of FIG. 7 does not require any digital to analog converters or analog to digital converters. Of course it should be appreciated that the circuit of FIG. 7 may be modified to provide a constant temperature rise (above ambient) sensor, in a manner analogous to that of FIG. 6A. For example, digital to analog converters may be used to set the ratio of R"/R' and the ratio of $R_3/R_3'$ to a desired value. Alternatively, one or more resistors (e.g., R") having a high thermal coefficient of resistance may be used to automatically compensate for changes in the ambient temperature of the fluid flowing into the sensor conduit.

Figure 8:
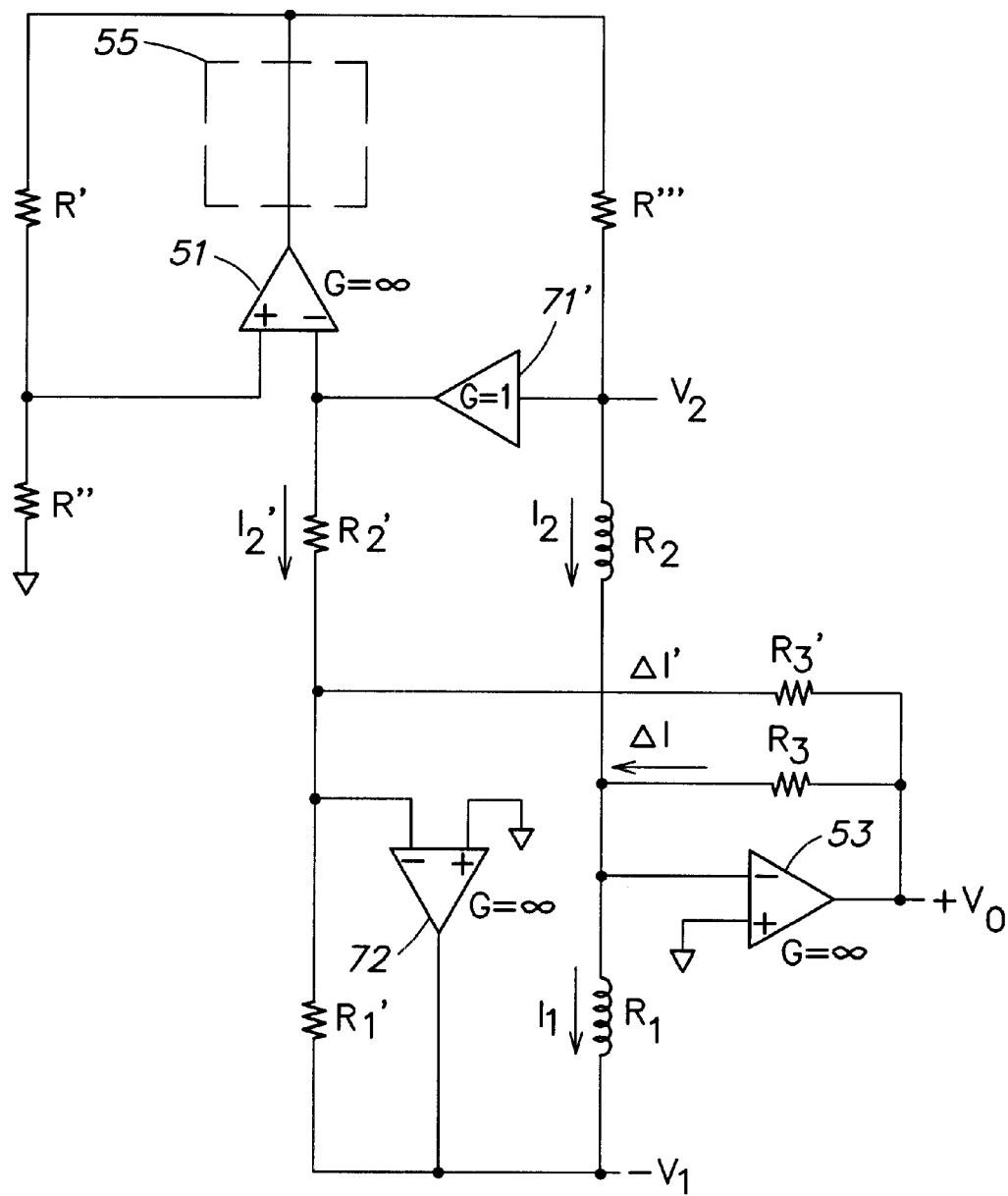
FIG. 8 is a constant temperature mass flow sensor according to yet another embodiment of the present invention.

FIG. 8 illustrates a mass flow sensor according to another embodiment of the present invention. The mass flow sensor of FIG. 8 is similar in operation to the mass flow sensor previously described with respect to FIG. 7. However, large gain operational amplifier 71 has been replaced by a unity gain buffer 71' connected between the midpoint of the second resistive branch that includes R'" and $R_2$, the inverting (−) input of operational amplifier 51, and resistor $R_2'$. As a result, the inverting (−) input of operational amplifier 51 is connected directly to resistor $R_2'$, rather than being connected thereto via operational amplifier 71 as in FIG. 7. Unity gain buffer 71' mirrors voltage $V_2$ and provides this voltage to the third resistive branch formed by the series connection of $R_2'$ and $R_1'$. As a result, the current through $R_2'$ and $R_2$ and the current through $R_1'$ and $R_1$ are equal with the result that the ratio of $R_2'/R_1'$ is equal to $R_2/R_1$.

In a manner similar to that of FIG. 7, the circuit of FIG. 8 operates to provide an amount of current $\Delta I$ to the upstream coil $R_1$ so that the resistance of coil $R_1$ is equal to that of coil $R_2$. As the output $V_o$ of operational amplifier 53 changes, the circuit of FIG. 8 also remains in balance as long as the ratio of $R_1/R_1'=R_2/R_2'=R_3/R_3'$. Thus, in contrast to the constant temperature mass flow sensors of the prior art, a close matching of components is not required.

Like the circuit of FIG. 7, the circuit of FIG. 8 may be modified in a number of ways, without departing from the basic operation of the circuit. Thus, for example, the non-inverting (+) input of operational amplifier 72 may be connected to the midpoint of the fourth resistive branch formed by coils $R_2$ and $R_1$, rather than being coupled to ground, or alternatively, the non-inverting (+) input of operational amplifier 53 may be connected to the midpoint of the third resistive branch formed by resistors $R_2'$ and $R_1'$, rather than being coupled to ground. Alternatively still, the circuit of FIG. 8 may be modified to provide a constant temperature rise (over ambient) mass flow sensor, rather than a constant temperature mass flow sensor. For example, the series combination of resistors R' and R" may be replaced with a digital to analog converter having a reference voltage input that receives the output of operational amplifier 51, an output that is coupled to the non-inverting (+) input of operational amplifier 51, and an input that receives an appropriately valued input word to set the value of coil $R_2$ to the desired value. Similarly, another digital to analog converter may be used to adjust the ratio of $R_3/R_3'$ to equal the value of $R_2/R_2'$ (or alternatively, so that the ratio of $\Delta I/\Delta I$ ' is equal to that of $I_2/I_2'$). This may be performed by adding a digital to analog converter between the output of operational amplifier 53 and resistor $R_3$ having a reference voltage input that receives the output of operational amplifier 53, an output that is coupled to resistor $R_3$, and an input that receives an appropriately valued input word to set the value of coil $R_3$ to the desired value.

Figure 9:
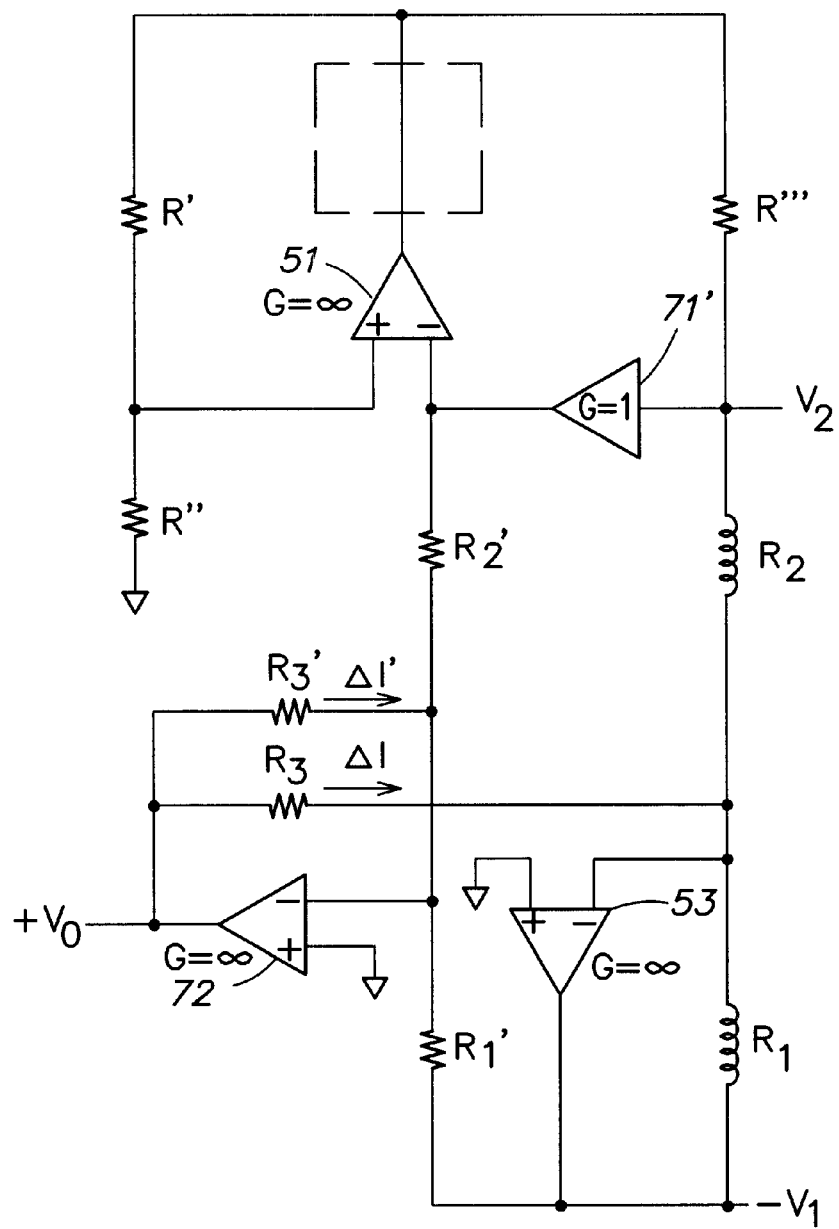
FIG. 9 is a constant temperature mass flow sensor according to yet another embodiment of the present invention.

FIG. 9 illustrates a mass flow sensor according to another embodiment of the present invention. The mass flow sensor of FIG. 9 is similar in operation to the mass flow sensor previously described with respect to FIG. 8. However, the configuration of operational amplifiers 53 and 72 in FIG. 9 is essentially the reverse of that in FIG. 8. In FIG. 9, the inverting (−) input of operational amplifier 72 is connected to the midpoint of the third resistive branch formed by $R_2'$ and $R_1'$, with the non-inverting (−) input of operational amplifier 72 being coupled to ground. In contrast to the circuit of FIG. 8, however, the output of operational amplifier 72 is coupled through resistor $R_3'$ to the midpoint of the fourth resistive branch formed by coil $R_1$ and coil $R_2$, and is fed back to the inverting (−) input of operational amplifier 72 through resistor $R_3$. The inverting (−) input of operational amplifier 53 is again connected to the midpoint of the fourth resistive branch formed by coil $R_1$ and coil $R_2$, with the non-inverting (+) input of operational amplifier being coupled to ground.

Thus, in FIG. 9, the portion of the circuit that provides the necessary amount of current $\Delta I$ to the upstream coil $R_1$ so that the resistance of coil $R_1$ is equal to that of coil $R_2$ includes operational amplifier 72 and resistors $R_3$ and $R_3'$. Advantageously, resistor $R_3'$ may again be a variable resistor that can be set to a value that eliminates gain/temperature coefficients and provides a constant gain despite changes in the ambient temperature of the fluid flowing into the sensor conduit.

In a manner similar to that of FIG. 8, the circuit of FIG. 9 operates to provide an amount of current $\Delta I$ to the upstream coil $R_1$ so that the resistance of coil $R_1$ is equal to that of coil $R_2$. Once again, as the output $V_o$ of operational amplifier 53 changes, the circuit of FIG. 9 also remains in balance as long as the ratio of $R_1/R_1'=R_2/R_2'=R_3/R_3'$. Thus, in contrast to the constant temperature mass flow sensors of the prior art, a close matching of components is not required.

Like the circuit of FIG. 8, the circuit of FIG. 9 may also be modified in a number of ways, while preserving the basic operation of the circuit. Thus, for example, the non-inverting (+) input of operational amplifier 72 may be connected to the midpoint of the fourth resistive branch formed by coils $R_2$ and $R_1$, rather than being coupled to ground, or alternatively, the non-inverting (+) input of operational amplifier 53 may be connected to the midpoint of the third resistive branch formed by resistors $R_2'$ and $R_1'$, rather than being coupled to ground. Moreover, for certain applications, it may be preferable to reverse the connections of operational amplifier 72, so that the inverting (−) input of operational amplifier 72 is coupled to ground with the non-inverting (+) input being connected to the midpoint of the third resistive branch formed by resistors $R_2'$ and $R_1'$. Like the circuits of FIGS. 7 and 8, the circuit of FIG. 9 may be modified to use digital to analog converters that can adjust and/or set the values of $R_2$ and $R_3$ to a desired value.

It should be appreciated that each of the mass flow sensors of FIGS. 5, 6A, and 7–9 may benefit from the use of one or more stabilizing circuits that improve the transient response of sensor without overshoot or ringing. As there are a wide variety of stabilizing circuits that are well known in the art and which may be used in conjunction with the mass flow sensors described with respect to FIGS. 5, 6A, and 7–9, a detailed description such circuits is omitted herein.

Although embodiments of the present invention have been described in terms of setting a temperature and thus, the resistance, of the downstream coil to a predetermined value and then adjusting an amount of current provided to the upstream coil to equal the resistance and thus, the temperature of the downstream coil, it should be appreciated that the present invention is not so limited. In this regard, the positions of coils $R_1$ and $R_2$ in the circuits of FIGS. 5, 6A, and 7–9 may be reversed, such that these circuits set the temperature (and thus, the resistance) of the upstream coil to a predetermined value and then adjust the amount of current provided to the downstream coil to equal the resistance, and thus the temperature, of the upstream coil.

Further, although embodiments of the present invention have been described with respect to a mass flow sensor that is particularly well suited for semiconductor manufacturing processes, it should be appreciated that embodiments of the present invention may be used in other applications and processes. For example, embodiments of the present invention may be used in automotive applications to measure the amount of a fluid such as gasoline, or diesel fuel, or air that is delivered to a combustion chamber. Moreover, embodiments of the present invention are not limited to mass flow sensors, as the present invention may be used in other sensor and detection circuits. For example, embodiments of the present invention may be readily adapted for use in a hot-wire anemometer or any other applications in which variations in the resistance of a leg of a resistive bridge circuit is indicative of a change in a property that varies with resistance.

Having described several embodiments of the invention in detail, various modifications and improvements will readily occur to those skilled in the art. Such modifications and improvements are intended to be within the scope of the invention. Accordingly, the foregoing description is by way of example only, and is not intended as limiting. The invention is limited only as defined by the following claims and the equivalents thereto.

What is claimed is:

1. A sensor, comprising:
   a first resistor and a second resistor each having a resistance that varies in response to a change in a physical property;
   a first circuit, electrically coupled to the first resistor, that provides a first current to the first resistor and the second resistor, the first current setting the resistance of the first resistor; and
   a second circuit, electrically coupled to the second resistor, that adjusts the resistance of the second resistor to equal the resistance of the first resistor.

2. The sensor of claim 1, further comprising:
   a processing circuit, coupled to the first and second circuits, that measures a difference in an amount of energy provided by the first and second circuits to the first and second resistors, respectively.

3. The sensor of claim 1, wherein the second circuit adjusts the resistance of the second resistor by changing an amount of a second current provided to the second resistor.

4. The sensor of claim 1, wherein the sensor is a mass flow sensor that measures a mass flow rate of a fluid that flows through a conduit about which the first and second resistors are disposed.

5. The sensor of claim 4, wherein a resistance value to which the first resistor is set corresponds to a temperature that is above an ambient temperature of the fluid entering the conduit.

6. The sensor of claim 4, wherein a resistance value to which the first resistor is set corresponds to a temperature that is approximately 30 to 100 degrees Celsius above an ambient temperature of the fluid entering the conduit.

7. The sensor of claim 1, wherein the resistance of the first and second resistors varies in response to a change in temperature.

8. The sensor of claim 1, wherein the first circuit includes a programmable voltage divider that sets the resistance of the first resistor.

9. The sensor of claim 1, wherein the first circuit includes a digital to analog converter that sets the resistance of the first resistor.

10. A sensor, comprising:
    a first resistor and a second resistor each having a resistance that varies in response to a change in a physical property;
    a first circuit, electrically coupled to the first resistor, that sets the resistance of the first resistor; and
    a second circuit, electrically coupled to the second resistor, that adjusts the resistance of the second resistor to equal the resistance of the first resistor;
    wherein the first circuit includes
        an amplifier having first and second inputs and an output,
        a voltage reference, electrically coupled to the first input of the amplifier, that determines the resistance to which the first resistor is set, and
        a third resistor, electrically coupled between the second input of the amplifier and the output of the amplifier; and
    wherein the first resistor is electrically coupled in series between the second and third resistors.

11. The sensor of claim 10, wherein the voltage reference includes a programmable voltage divider.

12. The sensor of claim 10, wherein the amplifier is a first amplifier, and wherein the second circuit includes:
    a second amplifier having first and second inputs and an output, the first input of the second amplifier being electrically coupled to a reference potential terminal, the second input being electrically coupled to the first and second resistors, and the second resistor being electrically coupled between the second input of the second amplifier and the output of the second amplifier; and
    a current source that is electrically coupled to the second input of the second amplifier and to the first and second resistors.

13. The sensor of claim 12, wherein the current source includes:
    a digital to analog converter having an output; and
    a fourth resistor that is electrically coupled between the output of the digital to analog converter and the second input of the second amplifier.

14. The sensor of claim 13, wherein the current source further includes:
    an analog to digital converter having an input and output; and
    a proportional/integral/differential controller having an input that is electrically coupled to the output of the analog to digital converter and having an output that is electrically coupled to the input of the digital to analog converter.

15. The sensor of claim 12, further comprising:
    a buffer that electrically couples the first and third resistors to the second input of the first amplifier, and
    a fourth resistor and a fifth resistor electrically coupled in series between the second input of the first amplifier and the output of the second amplifier.

16. The sensor of claim 15, wherein the reference potential terminal is a first reference potential terminal, and wherein the current source includes:
    a third amplifier having first and second inputs and an output, the first input of the third amplifier being electrically coupled to a second reference potential terminal having a same reference potential as the first reference potential terminal;

a sixth resistor that is electrically coupled between the output of the third amplifier, the first and second resistors, and the second input of the second amplifier; and a seventh resistor that is electrically coupled between the output of the third amplifier and the fourth and fifth resistors.

17. The sensor of claim 10, wherein the amplifier is a first amplifier and the second circuit includes:

a second amplifier having first and second inputs and an output, the first input of the second amplifier being electrically coupled to a reference potential terminal;

a fourth resistor and a fifth resistor that are electrically coupled in series between the second input of the first amplifier and the output of the second amplifier, the second input of the second amplifier being electrically coupled to the fourth and fifth resistors; and a current source that is electrically coupled to the first and second resistors.

18. The sensor of claim 17, wherein the reference potential terminal is a first reference potential terminal, and wherein the current source includes:

a third amplifier having first and second inputs and an output, the first input of the third amplifier being electrically coupled to a second reference potential terminal having a same reference potential as the first reference potential terminal;

a sixth resistor that is electrically coupled between the output of the third amplifier and the second input of the third amplifier, the sixth resistor being electrically coupled to the first and second resistors; and a seventh resistor that is electrically coupled between the output of the third amplifier and the second input of the second amplifier, the seventh resistor being electrically coupled to the fourth and fifth resistors.

19. A mass flow sensor comprising:

a first heat sensitive resistor and a second heat sensitive resistor disposed at spaced apart positions about a conduit through which a fluid flows, the first and second heat sensitive resistors each having a resistance that varies with temperature;

a first circuit, electrically coupled to the first heat sensitive resistor, that provides a first current to the first heat sensitive resistor and the second heat sensitive resistor, the first current setting the resistance of the first heat sensitive resistor to a value that corresponds to a predetermined temperature;

a second circuit, electrically coupled to the second heat sensitive resistor, that adjusts an amount of a second current provided to the second heat sensitive resistor so that the resistance of the second heat sensitive resistor equals the resistance of the first heat sensitive resistor; and a processing circuit, coupled to the first and second circuits, that measures a difference in an amount of energy provided by the first and second circuits to the first and second heat sensitive resistors, respectively.

20. The mass flow sensor of claim 19, wherein the value of resistance to which the first heat sensitive resistor is set corresponds to a predetermined temperature that is above an ambient temperature of the fluid entering the conduit.

21. The mass flow sensor of claim 19, wherein the value of resistance to which the first heat sensitive resistor is set corresponds to a predetermined temperature that is approximately 30 to 100 degrees Celsius above an ambient temperature of the fluid entering the conduit.

22. A mass flow sensor comprising:

a first heat sensitive coil and a second heat sensitive coil disposed at spaced apart positions about a conduit through which a fluid flows, the first and second heat sensitive coils each having a resistance that varies with temperature;

a first circuit, electrically coupled to the first heat sensitive coil, that sets the resistance of the first heat sensitive coil to a value that corresponds to a predetermined temperature;

a second circuit, electrically coupled to the second heat sensitive coil, that adjusts an amount of current provided to the second heat sensitive coil so that the resistance of the second heat sensitive coil equals the resistance of the first heat sensitive coil; and a processing circuit, coupled to the first and second circuits, that measures a difference in an amount of energy provided by the first and second circuits to the first and second heat sensitive coils, respectively;

wherein the first circuit includes
an amplifier having first and second inputs and an output,
a voltage reference, electrically coupled to the first input of the amplifier, that determines the resistance to which the first heat sensitive coil is set, and
a first resistor, electrically coupled between the second input of the amplifier and the output of the amplifier; and wherein the first heat sensitive coil is electrically coupled in series between the second heat sensitive coil and first resistor.

23. The mass flow sensor of claim 22, wherein the amplifier is a first amplifier, and wherein the second circuit includes:

a second amplifier having first and second inputs and an output, the first input of the second amplifier being electrically coupled to a reference potential terminal, the second input being electrically coupled to the first and second heat sensitive coils, and the second heat sensitive coil being electrically coupled between the second input of the second amplifier and the output of the second amplifier; and a current source that is electrically coupled to the second input of the second amplifier and to the first and second heat sensitive coils.

24. The mass flow sensor of claim 23, wherein the current source includes:

a digital to analog converter having an output; and a second resistor that is electrically coupled between the output of the digital to analog converter and the second input of the second amplifier.

25. The mass flow sensor of claim 24, wherein the current source further includes:

an analog to digital converter having an input and output; and a proportional/integral/differential controller having an input that is electrically coupled to the output of the analog to digital converter and having an output that is electrically coupled to the input of the digital to analog converter.

26. The mass flow sensor of claim 25, wherein the mass flow sensor is included in a mass flow controller.

27. The mass flow sensor of claim 23, further comprising:

a buffer that electrically couples the first heat sensitive coil and the first resistor to the second input of the first amplifier, and a second resistor and a third resistor electrically coupled in series between the second input of the first amplifier and the output of the second amplifier.

28. The mass flow sensor of claim 27, wherein the reference potential terminal is a first reference potential terminal, and wherein the current source includes:

a third amplifier having first and second inputs and an output, the first input of the third amplifier being electrically coupled to a second reference potential terminal having a same reference potential as the first reference potential terminal;

a fourth resistor that is electrically coupled between the output of the third amplifier, the first and second heat sensitive coils, and the second input of the second amplifier; and a fifth resistor that is electrically coupled between the output of the third amplifier and the second and third resistors.

29. The mass flow sensor of claim 28, wherein the mass flow sensor is included in a mass flow controller.

30. The mass flow sensor of claim 22, wherein the amplifier is a first amplifier and the second circuit includes:

a second amplifier having first and second inputs and an output, the first input of the second amplifier being electrically coupled to a reference potential terminal;

a second resistor and a third resistor that are electrically coupled in series between the second input of the first amplifier and the output of the second amplifier, the second input of the second amplifier being electrically coupled to the second and third resistors; and a current source that is electrically coupled to the first and second heat sensitive coils.

31. The mass flow sensor of claim 30, wherein the reference potential terminal is a first reference potential terminal, and wherein the current source includes:

a third amplifier having first and second inputs and an output, the first input of the third amplifier being electrically coupled to a second reference potential terminal having a same reference potential as the first reference potential terminal;

a fourth resistor that is electrically coupled between the output of the third amplifier and the second input of the third amplifier, the fourth resistor being electrically coupled to the first and second heat sensitive coils; and a fifth resistor that is electrically coupled between the output of the third amplifier and the second input of the second amplifier, the fifth resistor being electrically coupled to the second and third resistors.

32. The mass flow sensor of claim 31, wherein the mass flow sensor is included in a mass flow controller.

33. A method of balancing a resistance of a first resistor and a resistance of a second resistor, the resistance of the first and second resistors varying with temperature, the method comprising acts of:

(a) setting the resistance of the first resistor to a first value by providing a first amount of current to the first resistor and the second resistor; and (b) providing a second amount of current to the second resistor so that the resistance of the second resistor matches the first value of the first resistor.

34. The method of claim 33, wherein act (a) includes acts of:

(c) determining a temperature to which the first resistor is to be set; and (d) setting the resistance of the first resistor to a value of resistance that corresponds to the temperature determined in act (c).

35. The method of claim 34, wherein act (c) includes acts of:

(e) measuring an ambient temperature of a fluid flowing into a conduit about which the first resistor and the second resistor are disposed; and (f) incrementing the ambient temperature measured in act (e) by a predetermined amount.

36. The method of claim 35, wherein act (d) includes acts of:

(g) determining a division ratio to be provided by a programmable voltage divider to force the resistance of the first resistor to the first value; and (h) configuring the programmable voltage divider to provide the determined division ratio.

37. A method of setting the resistance of a resistor, comprising acts of:

(a) measuring an ambient temperature of a fluid flowing into a conduit about which the resistor is disposed;

(b) incrementing the ambient temperature measured in act (a) by a predetermined amount to identify a temperature to which the resistor is to be set;

(c) calculating a value of resistance corresponding the temperature identified in act (b);

(d) determining a division ratio to be provided by a programmable voltage divider to force the resistance of the resistor to the value calculated in act (c); and (e) configuring the programmable voltage divider to provide the division ratio determined in act (d).

38. The mass flow sensor of claim 19, wherein the first and second heat sensitive resistors are heat sensitive coils.

* * * * *